(12) United States Patent
Perlin

(10) Patent No.: US 6,633,682 B1
(45) Date of Patent: Oct. 14, 2003

(54) PROGRESSIVE FRACTAL RENDERING

(75) Inventor: Kenneth Perlin, New York, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 09/336,960

(22) Filed: Jun. 21, 1999

(51) Int. Cl.$^7$ .............................. G06K 9/36; G06K 9/46
(52) U.S. Cl. ...................................... 382/249; 382/240
(58) Field of Search ................................. 382/282, 276, 382/298, 299, 302, 305, 240, 249, 254, 173, 203, 267, 268, 269, 241; 707/101

(56) References Cited

U.S. PATENT DOCUMENTS

| | | | | |
|---|---|---|---|---|
| 4,261,018 A | * | 4/1981 | Knowlton | 358/470 |
| 4,941,193 A | * | 7/1990 | Barnsley et al. | 382/249 |
| 5,127,064 A | * | 6/1992 | Flinois et al. | 382/149 |
| 5,347,600 A | * | 9/1994 | Barnsley et al. | 382/249 |
| 5,768,437 A | * | 6/1998 | Monro et al. | 382/249 |
| 5,870,502 A | * | 2/1999 | Bonneau et al. | 382/249 |
| 6,014,671 A | * | 1/2000 | Castelli et al. | 707/101 |
| 6,091,394 A | * | 7/2000 | Bruckstein et al. | 345/112 |
| 6,125,211 A | * | 9/2000 | Lu et al. | 382/241 |

* cited by examiner

*Primary Examiner*—Bhavesh M. Mehta
*Assistant Examiner*—Kanji Patel
(74) *Attorney, Agent, or Firm*—Ansel M. Schwartz

(57) ABSTRACT

A method for producing an image. The method includes the steps of forming a procedural representation of the image. Then there is the step of taking samples of the image. Next there is the step of rendering larger shapes in the samples as progressively smaller shapes which cover the larger shapes until the larger shapes become represented by smaller shapes each occupying exactly one pixel, wherein the time it takes to render each smaller shape is essentially the same. An apparatus for producing an image. The apparatus includes a computer. The apparatus includes a memory connected to the computer. The apparatus includes a computer display connected to the computer. The apparatus includes a pointer device connected to the computer. The apparatus includes a mechanism for taking samples of the image and rendering larger shapes in the samples of the image as progressively smaller shapes which cover the larger shapes until the larger shapes become represented by smaller shapes each occupying exactly one pixel. The taking mechanism is disposed in the memory.

11 Claims, 3 Drawing Sheets

PROGRESSIVE FRACTAL RENDERING

FIELD OF THE INVENTION

The present invention is related to the use of a fractal pattern for progressive transmission of an existing image. More specifically, the present invention is related to the use of a fractal pattern for progressive transmission of an existing image where the fractal pattern renders larger shapes in samples of the pattern as progressively smaller shapes which cover the larger shapes until the larger shapes become represented by smaller shapes each occupying exactly one pixel.

BACKGROUND OF THE INVENTION

Other techniques exist that use a fractal pattern for progressive transmission of an existing image, such as is taught by Shapiro (U.S. Pat. No. 5,321,776), incorporated by reference herein.

But when the image is being generated procedurally by point sampling, the problem to be solved is different. In this case, the only query that such the algorithm can make at any given moment is "what is the value of the image at a given pixel (i,j)?" It is this latter problem that the present invention addresses.

A very simple approach would be to first scan the image in a coarse grid, computing every $2^N \times 2^N$ pixels, and displaying the result as a set of squares of size $2^N \times 2^N$, and then to successively halve the grid size until a full-resolution image is displayed. A deficiency with this approach is that it requires computing the value at some pixels many times, which leads to a loss of computational efficiency. In particular, this approach more than 5/4 as many samples as an optimally efficient technique.

Alternatively, the already-computed values could be stored in a table, and reused to create the fine grid. A deficiency with this approach is that it requires either a large amount of intermediate storage for this table, or else the ability to read from the display device colors that have already been written to it.

The present invention suffers from neither of the above deficiencies. It is optimally efficient, requiring only one computation per pixel. In addition, the invention has the advantage that the developing pattern does not appear as a regular grid, but rather as a varying impressionistic pattern that is much more visually pleasing to the viewer, and much less visually distracting, than a simple square grid would be.

SUMMARY OF THE INVENTION

The present invention pertains to a method for producing an image. The method comprises the steps of forming a procedural representation of the image. Then there is the step of taking samples of the image. Next there is the step of rendering larger shapes in the samples as progressively smaller shapes which cover the larger shapes until the larger shapes become represented by smaller shapes each occupying exactly one pixel, wherein the time it takes to render each smaller shape is essentially the same.

The present invention pertains to an apparatus for producing an image. The apparatus comprises a computer. The apparatus comprises a memory connected to the computer. The apparatus comprises computer display connected to the computer. The apparatus comprises a pointer device connected to the computer. The apparatus comprises a mechanism for taking samples of the image and rendering larger shapes in the samples of the image as progressively smaller shapes which cover the larger shapes until the larger shapes become represented by smaller shapes each occupying exactly one pixel, wherein the time it takes to render each smaller shape is essentially the same. The taking mechanism is disposed in the memory.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
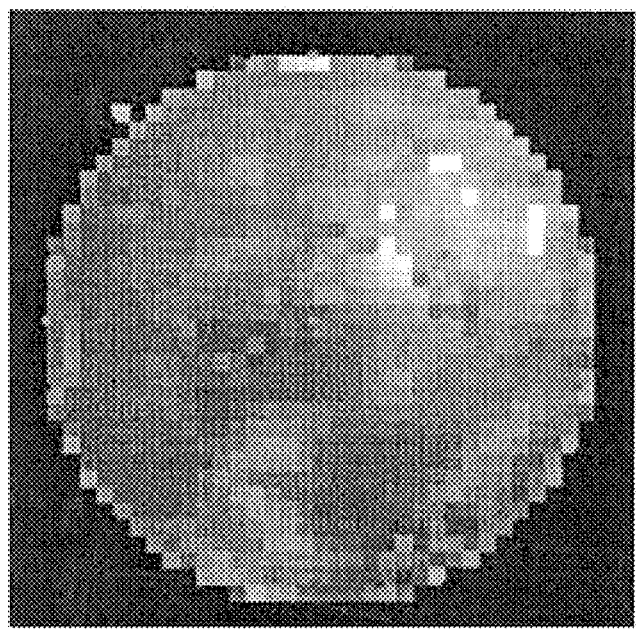
FIG. 1 shows the image after a first pass using a method of the present invention.
Figure 2:
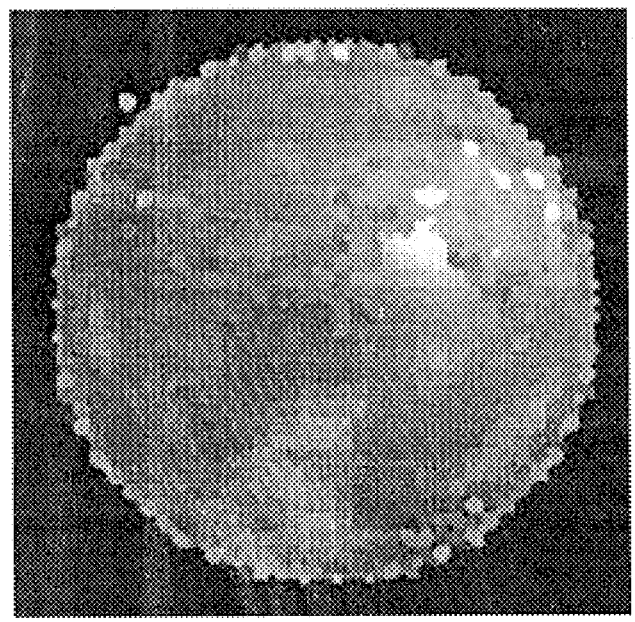
FIG. 2 shows the image after several more passes using the method of the present invention.
Figure 3:
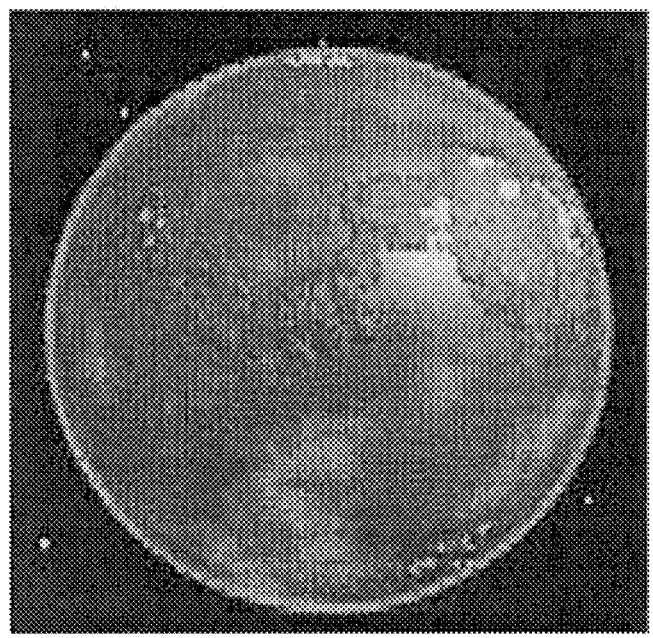
FIG. 3 shows the image after many passes using the method of the present invention.
Figure 4:
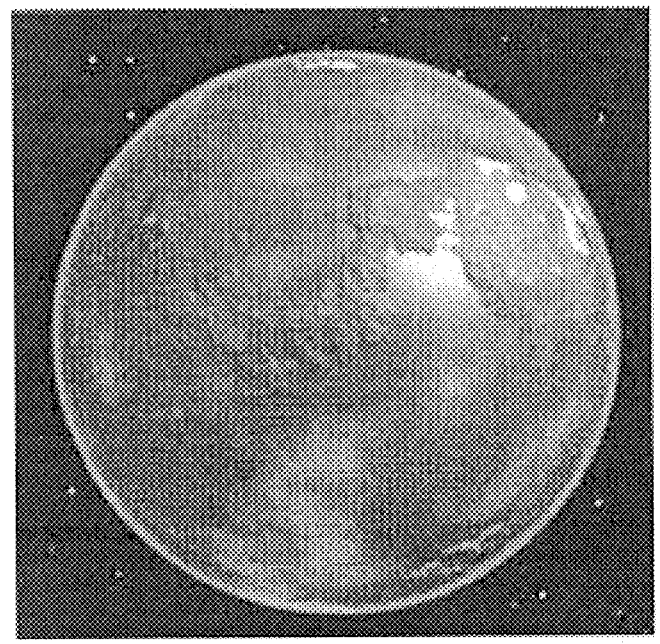
FIG. 4 shows the image after the last pass has been completed using the method of the present invention.
Figure 5:
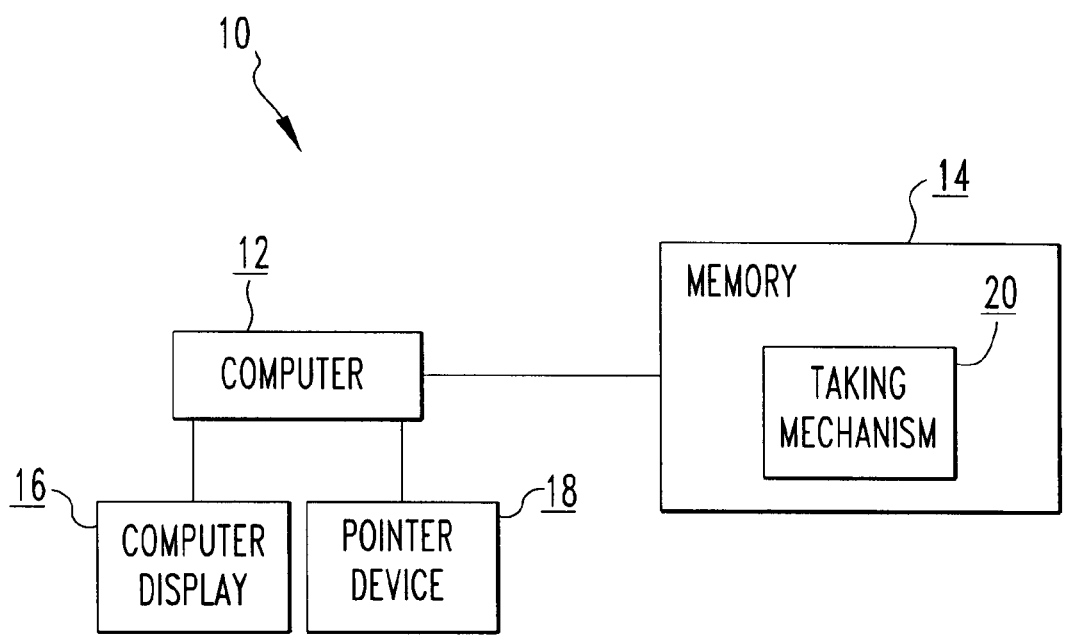
FIG. 5 is a schematic representation of the apparatus of the present invention.

Referring now to the drawings wherein like reference numerals refer to similar or identical parts throughout the several views, and more specifically to FIG. 5 thereof, there is shown an apparatus 10 for producing an image. The apparatus 10 comprises a computer 12. The apparatus 10 comprises a memory 14 connected to the computer 12. The apparatus 10 comprises a computer display 16 connected to the computer 12. The apparatus 10 comprises a pointer device 18 connected to the computer 12. The apparatus 10 comprises a mechanism 20 for taking samples of the image and rendering larger shapes in the samples of the image as progressively smaller shapes which cover the larger shapes until the larger shapes become represented by smaller shapes each occupying exactly one pixel of the computer display 16, wherein the time it takes to render each smaller shape is essentially the same. The taking mechanism 20 is disposed in the memory 14. The taking mechanism 20 is preferably a computer program as described below.

The present invention pertains to a method for producing an image. The method comprises the steps of forming a procedural representation of the image. Then there is the step of taking samples of the image. Next there is the step of rendering larger shapes in the samples as progressively smaller shapes which cover the larger shapes until the larger shapes become represented by smaller shapes each occupying exactly one pixel, wherein the time it takes to render each smaller shape is essentially the same.

Preferably, before the taking step, there it is the step of choosing a view of the image to be displayed on a monitor. The rendering step preferably includes the steps of changing the view of the image. Then there is the step of halting the rendering step. Next there is the step of starting a new rendering step.

Preferably, after the forming step, there is the step of sub-dividing the image into a tiling wherein the tiling is a division of the image into shapes and each pixel lies in exactly one of the shapes, and the taking samples step includes the step of taking samples of the tiling. After the subdividing step, there is preferably the step of creating the tiling on a P×P grid, where P is a positive even integer. The tiling shapes are preferably squares, although they can be triangles, rectangles, hexagons or combinations thereof.

Preferably, the creating step includes the step of generating a sequence of N×N offsets $sx_n$, $sy_n$ and square sizes $ss_n$, where n is less than or equal to N×N. The generating step preferably includes the step of sampling pixels of each N×N tile at a point which is offset by $sx_n$, $sy_n$. Preferably, after the pixel sampling step, there is the step of displacing low order bits of x, y position slower than high order bits of x, y position as the rendering step progresses.

The apparatus 10 lets its user interact with a procedurally generated image by the computer 12 or from an image stored in memory 14 at interactive frame rates, while maintaining the following properties:

If the user fixes on a particular view for any significant period of time (thereby fixing the function that computes a color value for each pixel of the image), the picture will continually "develop", increasing smoothly in image quality.

This is done in such a way that for a given view, no pixel color need ever be computed more than once.

No intermediate storage of already computed samples it required (other than the output display itself), and the algorithm never needs to look at the output display to fetch colors that have been written to it. This property is valuable because it enables the technique to work in situations where there is only one-way communication from the algorithm to the display device.

Each hardware element individually of the apparatus is as follows:

A computer 12

A computer display 16

A pointer device 18, such as a mouse

A memory 14

The process of operation from start to finish, as seen by the user, is as follows. The user does some interaction to select parameters of a view to be computed. This selection could, for example, be selection of the viewpoint simulated lighting parameters shape of simulated objects in the simulation, all of which are well known in the art The user sees a continually improving image of the underlying procedural representation. Successive samples are rendered as progressively smaller shapes. The sizes and positions of these shapes are such that the initial larger shapes are progressively covered by the smaller ones. The algorithm results in these initial larger shapes eventually becoming whittled down to a single pixel, because parts of them are successively covered by parts of overlapping shapes that are displayed later in the algorithm.

During the course of the progressive rendering, the resolution is equal everywhere across the image, and by the time rendering is complete, each sample occupies exactly one pixel of the final image.

If at any time during the progressive rendering phase the user changes the view, then the current progressive rendering phase is halted, and a new progressive rendering phase is immediately begun.

The internal sequence of operation that's making it work is as follows. The image is subdivided into a tiling. A tiling is a division of the image into equal shapes, such that each pixel lies in exactly one of the shapes. In the current embodiment, the tiling shapes are squares. The technique consists of two phases, an optional initial set-up phase, which need only be performed once, and a progressive rendering phase, which is done every time the user has chosen a view. The pattern is created on an P×P grid, for some P which is a positive power of 2 (e.g., 4,8,16,32). Also, in the current embodiment the rendering pattern is optimized by storing its parameters in a table during the set-up pass. These parameters can also be computed during the rendering passes themselves.

The initial set-up phase generates the fractal pattern. This pattern consists of a sequence of N×N offsets $sx_n$,$sy_n$ and square sizes $ss_n$, where n<N×N. Within each N×N square tile of the image, pixels will be sampled at a point which is offset by $sx_n$,$sy_n$, and the resulting color will be displayed as a square centered at $sx_n$,$sy_n$, of length $ss_n$.

The general pattern of offsets is a fractal, in which the low order (low value) bits of x,y position are displaced slowly as the sequence progresses, whereas the high order (large value) bits of x,y position are displaced quickly as the sequence progresses. Each recursive level of this fractal fills the 2×2 square in some order. Any one of the 24 possible orderings may be used that fill the four pixels in a 2×2 square. In the current embodiment (shown in the code below), the 2×2 square is filled in the pattern: [(0,0), (1,1), (1,0), (0,1)]

In the current embodiment, the sequences $sx_n$,$sy_n$,$ss_n$ are generated as follows:

```
for ( n = N*N ; n >= 1 ; n = n - 1 )
  sx[n] = sy[n] = 0
  for ( i = N/2; i >= 1 ; i = i/2)
    b = n/i/i
    sx[n] = sx[n] + (b12) % 2 * N/i/2      // X offset for this pass
    sy[n] = sy[n] + (b - 1) % 2 * N/i/2    // Y offset for this pass
    ss[n] = if b == 1 then N/i else max(1,ss[n])  // Square size for this pass
```

When the image is displayed, then within each N×N tile of the image the three sequences are used as follows, in each of the N×N successive rendering passes:

for (n=1; n<=N*N; n=n+1)
        for (x=sx[n]; x<width; x=x+N)
            for (y=sy[n]; y<height; y=y+N)
                sample at point (x,y)
                display size ss[n]square centered at (x,y)

Note that the progressive rendering as thus defined does not change the apparent position of any pixel over the image during the gradual refinement between successive passes.

In the current embodiment, the squares are rendered as constant color. It is also possible, using the method of the invention, to render the squares as interpolated colors, as long as the color displayed into pixel (x,y) at each pass equals the final desired color at that pixel. This would produce a "blurry" appearance for each intermediate pass, as opposed to the "blocky" appearance shown in the current embodiment.

The source code, which follows in the Appendix, implements the invention and specifically the example of a procedurally generated Earth-like planet, shown in FIGS. 1–4. FIGS. 1–4 show the progressive display of the calculated image, in steps, while it is being calculated. While this code is specifically for the example, it can be used for any procedurally generated image by simply changing that part of the code which simply identifies what the image is of. It should be noted that while squares are used in the preferred embodiment to create the image, any shape could be used as the unit of formation; such as triangles, rectangles, hexagons, etc., and even multiple shapes in combination, i.e., squares and triangles.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

```
import java.awt.*;
import java.awt.image.*;
import java.util.*;
public class Planet1 extends GenericApplet
{
    boolean rerender = true;
    int band = 16, pass = 0, width = 100, height = 100, zoom = 0;
    double x0 = -1.5, y0 = -1.5, scale = 3./100, theta = 0, S = 0, C = 1;
    double time = 0;
    // Create the progressive rendering pattern
    int N = 0;
    int[] sx, sy, ss;
    void initSxy(int _N) {
        N = _N;
        sx = new int [N*N];
        sy = new int [N*N];
        ss = new int [N*N];
        int b;
        for (int n = N*N-1 ; n >= 0 ; n--)
        for (int i = N/2 ; i > 0 ; i /= 2) {
            b = n/i/i+i;
            sx[n] += (b/2) % 2 * N/i/2;
            sy[n] += (b-1) % 2 * N/i/2;
            ss[n] = b==1 ? N/i : Math.max(1,ss[n]);
        }
    }
    // Seed the noise function to choose this particular planet
    static { NewMath.seedNoise(401); }
    int mouseX = 100, mouseY = 100;
    public boolean mouseMove(Event e, int x, int y) {
        mouseX = x;
        mouseY = y;
        return true;
    }
    int downX = 0, downY = 0;
    public boolean mouseDown(Event e, int x, int y) {
        downX = x;
        downY = y;
        return true;
    }
    final int M = 32;
    boolean isMag = false;
    Image magImage = null, image2;
    public boolean mouseDrag(Event e, int x, int y) {
        mouseX = x;
        mouseY = y;
        if (! isMag) {
            image2 = createImage (width, height);
            magImage = ceateImage(2*M+2, 2*M+2);
        }
        Graphics g = magImage.getGraphics();
        g.setColor(Color.black);
        g.fillRect(0, 0, 2*M+2, 2*M+2);
        int u, v;
        double mx = .25 * (x - downX) + downX;
        double my = .25 * (y - downY) + downY;
        for (int i = 0 ; i < M ; i++) {
            u = 1 - M/2;
            for (int j = 0 ; M ; j++) {
                v = j - M/2;
                if (u*u + v*v < M*M/4) {
                    g.setColor(shadePixel(mx+.5*u, my+.5*v));
                    g.fillRect(2*i, 2*j, 2, 2);
                }
            }
        }
        isMag = true;
        return true;
    }
    public void paint(Graphics g) {
        if (image != null)
            if (isMag) {
                Graphics g2 = image2.getGraphics();
                g2.drawImage(image, 0, 0, this);
                g2.drawImage(magImage, mouseX-M, mouseY-M, this);
                g.drawImage(imge2, 0, 0, this);
            }
            else
                g.drawImage(image, 0, 0, this);
    }
    public boolean mouseUp(Event e, int x, int y) {
        mouseX = x;
        mouseY = y;
        if (isMag) {
            isMag = false;
            return true;
        }
        int d = Math.abs(x-width/2);
        if (y < band && d > 25 && d < 25+2*band) //
            CLICK ON ARROWS TO ROTATE
            rotate(x < width/2 ? -10 : 10);
        else if (e.modifiers == Event.ALT_MASK ||
                e.modifiers == Event.META_MASK) //
            MIDDLE/RIGHT CLICK TO ZOOM OUT
            zoom(-i, x, y);
        else                          // LEFT CLICK TO ZOOM IN
            zoom(1, x, y);
        return true;
    }
    void zoom(int delta, int x, int y) {
        if (delta > 0) {
            if (zoom >= 40)
                return;
            scale /= 2;
            x0 += scale * x;
            y0 += scale * y;
        }
        else {
            x0 -= scale * x;
            0 -= scale * y;
            scale *= 2;
        }
        zoom += delta;
        forceRerender();
    }
    void rotate(int delta) {
        theta -= 2 * delta * scale;
        S = Math.sin(theta);
        C = Math.cos(theta);
        forceRerender();
    }
    boolean isGridview = fa
    public boolean keyDown(Event e, int key) {
        switch (key) {
        case 1004: // down arrow
            zoom(1, mouseX, mouseY);
            break;
        case 1005: // up arrow
            zoom(-1, mouseX, mouseY);
            break;
        case 1006: // left arrow
            rotate(-10);
            break;
        case 1007: // right arrow
            rotate(10);
            break;
        case 'g': // toggleGridView
            isGridView = ! isGridView;
            forceRerender();
            break;
        }
        return true;
    }
    double[] point = new double[3]; // surface point
    double[] normal = new double[3]; // surface normal
    double[] color = new double[3]; // pixel color
    double rr, t;
    boolean surfacePoint(double x, double y, double[] p) {
        // Compute x and y of the point
        p[0] = x0 + scale * x;
        p[1] = -(y0 + scale * y;
```

```
         // If point is on the sphere, then compute z coordinate
         rr = p[0] *p[0] + p[1] * p[1];
         if (rr < 1)
            p[2] = Math.sqrt(1 - rr);
         return rr < 1;
      }
      void transformPoint(double[] p) {
         double x = p[0];
         double z = p[2];
         p[0] = C*x + S*z;
         p[2] = -S*x + C*z;
      }
      FractalNoise fn1 = new FractalNoise(1, .5);
      FractalNoise fn2 = new FractalNoise(.5, .125);
      FractalNoise fn3, fn4;
      void forceRerender() {
         rerender = true;
      }
      public void render(Graphics g) {
         if (damage) {
            scale *= (double)width / bounds().width;
            width = bounds() .width;
            height = bounds() .height;
            for (N = 1 ; N * 16 < width ; N *= 2)
               ;
            initSxy(N);
            forceRerender();
         }
         if (rerender) {
            rerender = false;
            makeGrid() ;
            pass = 0;
         }
         if (pass >= N*N)
            return;
         pass = pass % (N*N);
         int s = pass < N*N ? ss[pass % (N*N)] : 1;
         if (time == 0) {
            x0 = -1.5;
            y0 = -1.5 * height / width;
            g.setColor(Color.black);
            g.fillRect(0, 0, width, height);
         }
         time += .01;
         // Loop over all pixels
         for (int y = sy[pass % (N*N)] ; y < height ; y += N)
         for (int x = sx[pass % (N*N)] ; x < width ; x += N) {
            if (rerender) {
               rerender = false;
               return;
            }
            g.setColor(shadePixel(x, y));
            g.fillRect(x-s/2,y-s/2,s,s);
         }
         if (isGridView) {
            g.setColor(Color.red);
            for (int x = 0 ; x < width ; x += N)
               g.drawLine(x, 0, x, height);
            for (int y = 0 ; y < height ; y += N)
               g.drawLine(0, y, width, y);
         }
         // Display user controls along the top
         g.setColor(Color.black);
         g.fillRect(0, 0, width, 2*band);
         g.setColor(Color.white);
         int p = 100*Math.min(pass+1,N*N)/N/N;
         g.drawString(p + "%", width-(p<10 ? 20 : p<100 ? 25 : 29), band/2+5);
         g.drawString("zoom=" + zoom, 4, band/2+5);
         double ry = y0 + scale * mouseY;
         double rx = (x0 + scale * mouseX) / Math.sqrt(1-Math.min
         (1,ry*ry));
            t = Math.asin(Math.max(-1,Math.min(1,-rx))) - theta;
            t = Math.IEEEremainder(t * 180 / Math.PI, 360);
            g.drawString("longitude=" + displayedValue(t), 4, 14+band/
            2+5);
            t = Math.asin(Math.max(-1,Math.min(1, -ry)));
            t = t * 180 / Math.PI;
            g.drawString("latitude=" + displayedValue(t), width/2-18,
            14+band/2+5);
         g.setColor(Color.red);
         g.drawString("rotate", width/2-18, band/2+5)
         int[] x = { width/2-25-3*band/2, width/2-25-band/2,
         width/2-25-band/2 };
         int[] y = { band/2, 0, band };
         g.fillPolygon(x, y, x.length);
         for (int i = 0 ; i < ength ; i++)
            x[i] = width - x[i];
         g.fillPolygon(x, y, x.length);
         pass++;
      }
      Color shadePixel(double x, double y) {
         color[0] = color[1] = color[2] = 0;
         // Compute x and y of the point, and shade if on sphere
         if (surfacePoint(x, y, point)) {
            // On a unit sphere, the normal is the same as the point
            normal[0] = point[0];
            normal[1] = point[1];
            normal[2] = point[2];
            transformPoint.(point);
            // Perturb surface normal, choose a material, and do shading
            perturbNormal(nomal, point, x, y, scale);
            chooseMaterial();
            doShading(normal, color);
            cloudCover(color);
            // Antialias the edge of the planet sphere
            t = 2 * scale;
            if (1 - rr < t) {
               t = (1 - rr) / t;
               for (int j = 0 ; j < 3 ; j++)
                  color[j] *= t;
            }
         }
         // Create a star-field texture in the background
         else
            starField(point, color);
         // Add atmospheric haze near the edge of the sphere
         if (rr ) > .9 && rr < 1.04) {
            t = rr < 1 ? .9 : 1.04;
            t = (t - rr) / (t - 1);
            t = .5 * t * t;
            for (int j = 0 ; j < 3 ; j++)
               color[j] += t * (.7 - color[j]);
         }
         // Adjust for over-saturated colors
         t = Math.max(color[0], Math.max(color[1], color[2]));
         if (t > 1)
            for (int j = 0 ; j < 3 ; j++)
               color[j] /= t;
         return new Color( (float)color[0], (float)color[1], (float)color[2]);
      }
      String displayedValue(double t) {
         double r = 1;
         while (r * scale < .001)
            r *= 10;
         return (r==1) ?   " " + (int)t :
                          " " + Math.floor(t*r) / r;
      }
      void starField(double[] point, double[] color) {
         if (NewMath.noise(30 * point[0], 30 * point[1]) < -.55) {
            double t = NewMath.noise(3*point[0], 3*point[1]);
            color[0] = color[.    color[2] = NewMath.gain(.6 + :, .8);
         }
      }
      double ambient[] = {.1, .1, .1};
      double diffuse[];
      double specular[];
      double light [][][] = {
         {{ .6, .6, .5}, {1,1,1}},
         {{-.7, -.2, .0}, {.3, .3, .3}},
      };
      public void doShading(double[] normal, double[] color)
      {
         double dp = 0, s;
         // Ambient component
         for (int i = 0 ; i < 3 ; i++)
            color [i] = ambient [i];
         // Add up shading from all light sources
```

-continued

```
    for (int k = 0 ; k < light.length ; k++) {
      double[] Ldirection = light[k] [0];
      double [] Lcolor = light [k] [1];
      // Diffuse component
      dp = Ldirection[0] *normal[0] + Ldirection[1] *normal[1] +
      Ldirection[2] *normal[
      if (dp > 0)
        for (int i = 0 ; i < 3 ; i++)
          color[i] += Lcolor[i] * diffuse[i] * dp;
      // Specular component
      s = 2 * dp * normal[2] - Ldirection[2];
      if (s > 0) {
        s = Math.pow(s, specular[3]);
        for (int i = 0 ; i < 3 ; i++)
          color[i] += Lcolor[i]* specular[i] * s;
      }
    }
  }
  double[] pu = new double[3];
  double[] pv = new double[3];
  double du, dv, delta;
  void perturbNormal(double[] normal, double[] p, double x, double y,
  double scale) {
    double f = f(p, x, y, scale);
    if (f == 0)
      return;
    delta = .1 * (.2 + normal [2]);
    surfacePoint(x+delta, y, pu);
    surfacePoint(x, y+delta, pv);
    transformPoint (pu);
    transformPoint (pv);
    du = (f(pu, x+delta, y, scale) - f) / delta / scale / scale;
    dv = (f(pv, x, y+delta, scale) - f) / delta / scale / scale;
    for (int i = 0 ; i < 3 ; i++)
      normal[i] -= du * (pu[i]-p[i]) + dv * (pv[i]-p[i]);
    NewMath.normalize(normal);
  }
  Bicubic[] [] grid;
  int P;
  void makeGrid() {
    P = N;
    double cutoff = Math.min(.125, width*scale);
    fn3 = new FractalNoise(.125, cutoff);
    fn4 = new FractalNoise(cutoff, scale);
    double[] v = new double[3];
    double[] [] h = new double[(width+P-1)/P+4] [(height+P-1)/P+4];
    for (int y = 0 ; y < width + 4*P ; y += P)
    for (int x = 0 ; x < height + 4*P ; x += P) {
      if (surfacePoint(x-P, y-P, v)) {
        transformPoint (v);
        h[x/P] [y/P] = fn3.eval (v);
      }
    }
    grid = new Bicubic[(width+P-1)/P] [(height+P-1)/P];
    double [] [] G = new double [4] [4];
    for (int y = 0 ; y < width ; y += P)
    for (int x = 0 ; x < height ; x += P) {
      for (int j = 0 ; j < 4 ; j++)
      for (int i = 0 ; i < 4 ; i++)
        G[i] [j] = h[x/P + i] [y/P + j];
      grid[x/P] [y/P] = new Bicubic(G);
    }
  }
  double gridEval (Bicubic [] [] grid, double x, double y) {
    int i = (int)x / P;
    int j = (int)y / P;
    return grid[i] [j] .eval(x/P-i,y/P-j);
  }
  double altitude, snow, yy, cc;
  // Generate altitude-related quantities
  double f (double [] v, double x, double y, double scale) {
    yy = v[1] * v[1];
    altitude = -.1 - .25 * yy;
    cc = altitude/2;
    double h1 = fn1.eval(v);
    double h2 = fn2.eval(v);
    int i = (int)x / P;
    int j = (int)y / P;
    double h3 = gridEval(grid, x, y) + (isGridView ? 0 : fn4.eval(v));
    altitude += h1 + h2 + h3;
    cc += h2 + h3;
    snow = h3;
    returnMath.max(altitude, 0);
  }
  // Use the height function to generate cloud cover
  void cloudCover(double[] color) {
    if (cc < 0) {
      cc = NewMath.gain(-1.75 * cc, .7);
      t = (1 + color[1]) / 2;
      for (int i = 0 ; i < 3 ; i++)
        color[i] += cc * (t - color[i]);
    }
  }
  // Choose the appropriate surface material for this altitude
  static double[] oceanDiffuse = {0, 0, 1};
  static double[] oceanSpecular = {1,1,0,10);
  static double[] snowDiffuse = {1,1,1};
  static double[] snowSpecular = {0,0,0,1};
  static double[] landDiffuse = {0,.4,0};
  static double[] landSpecular = {.15,.15,2};
  void chooseMaterial() {
    if (altitude <= 0) {
      diffuse = oceanDiffuse;
      diffuse[1] = .35-Math.min(.1,-8*altitude); // ocean is greener
      near shore
      specular = oceanSpecular;
    }
    else if (altitude > .2*(1-yy) && snow > .0025/yy) { // snow needs
    altitude
      diffuse = snowDiffuse;
      specular = snowSpecular;
    }
    else {
      diffuse = landDiffuse;
      //diffuse[0] = Math.min(4*altitude+1.5*yy*yy,.6); // land
      is redder in mountai
      diffuse[0] = Math.min(4*altitude+.1*yy+.1*snow-.1,.6);
      // land is redder in mo
      specular = landSpecular;
    }
  }
}
```

What is claimed is:

1. A method for producing an image comprising the steps of:
forming a procedural representation of the image;
taking samples of the image; and
rendering larger shapes in the samples as progressively smaller shapes which cover the larger shapes causing the image to increase smoothly in image quality until the larger shapes become represented by smaller shapes each occupying exactly one pixel and form the image, wherein the time it takes to render each smaller shape is essentially the same.

2. A method as described in claim 1 including before the taking step, there it is the step of choosing a view of the image to be displayed on a monitor.

3. A method as described in claim 2 wherein the rendering step includes the steps of changing the view of the image; halting the rendering step; and starting a new rendering step.

4. A method as described in claim 3 including after the forming step, there is the step of sub-dividing the image into a tiling wherein the tiling is a division of the image into shapes and each pixel lies in exactly one of the shapes, and the taking samples step includes the step of taking samples of the tiling.

5. A method as described in claim 4 including after the subdividing step, there is the step of creating the tiling on a P×P grid, where P is a positive even integer.

6. A method as described in claim 5 wherein the creating step includes the step of generating a sequence of N×N offsets $sx_n$, $sy_n$ and square sizes $ss_n$, where n is less than or equal to N×N.

7. A method as described in claim 6 wherein the generating step includes the step of sampling pixels of each N×N tile at a point which is offset by $sx_n, sy_n$.

8. A method as described in claim 7 including after the pixel sampling step, there is the step of displacing low order bits of x, y position slower than high order bits of x, y position as the rendering step progresses.

9. A method as described in claim 8 wherein the tiling shapes are squares.

10. A method as described in claim 8 wherein the tiling shapes are triangles, rectangles, hexagons or combinations thereof.

11. An apparatus for producing an image comprising:

a computer;

a memory connected to the computer;

a computer display connected to the computer;

a pointer device connected to the computer; and a mechanism for taking samples of the image and rendering larger shapes in the samples of the image as progressively smaller shapes which cover the larger shapes causing the image to increase smoothly in image quality until the larger shapes become represented by smaller shapes each occupying exactly one pixel and form the image, wherein the time it takes to render each smaller shape is essentially the same, said taking mechanism disposed in the memory.

\* \* \* \* \*